J. LEDWINKA.
DUPLEX ROTARY ELECTRIC WELDING MACHINE.
APPLICATION FILED APR. 17, 1919.

1,351,717.

Patented Aug. 31, 1920.
3 SHEETS—SHEET 1.

Inventor
Joseph Ledwinka
Attorney
Samuel E. Darby

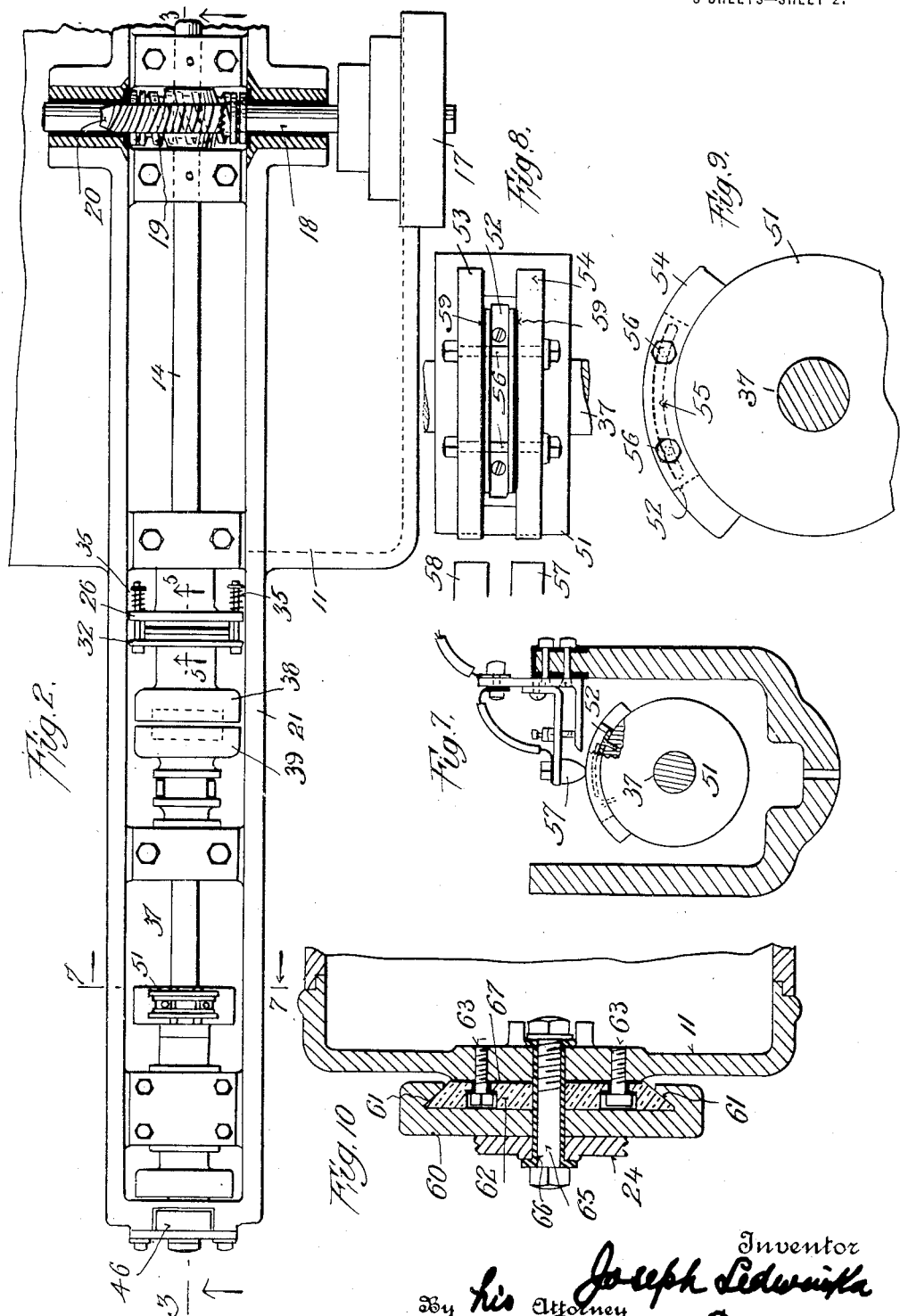

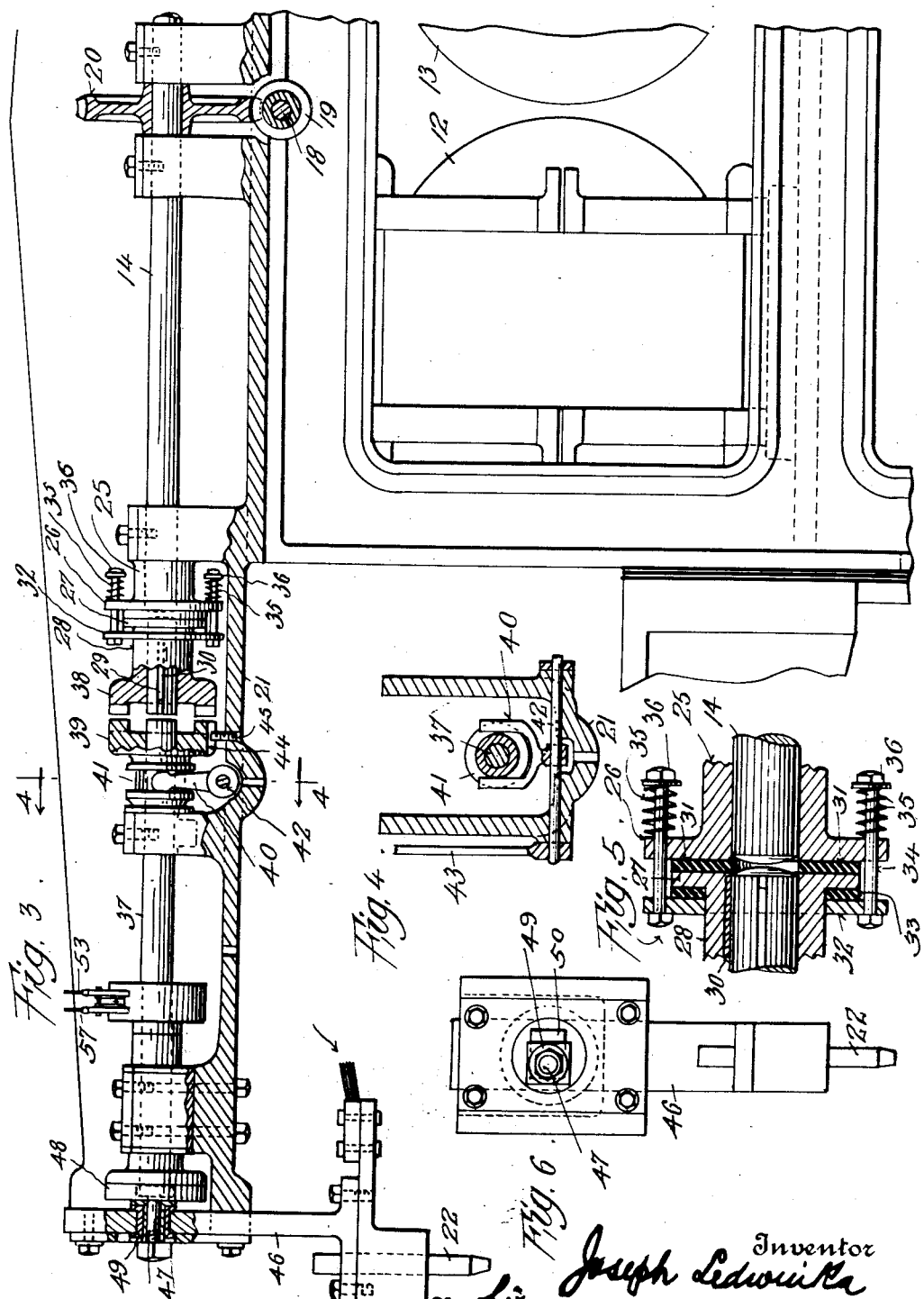

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

DUPLEX ROTARY ELECTRIC WELDING-MACHINE.

1,351,717.  Specification of Letters Patent.  Patented Aug. 31, 1920.

Application filed April 17, 1919. Serial No. 290,783.

*To all whom it may concern:*

Be it known that I, JOSEPH LEDWINKA, a citizen of the United States, residing at Philadelphia, in the county of Philadelphia, State of Pennsylvania, have made a certain new and useful Invention in Duplex Rotary Electric Welding-Machines, of which the following is a specification.

This invention relates to duplex rotary electric welding machines.

The object of the invention is to provide rotary means for controlling electric welding machines.

A further object of the invention is to provide means to prevent springing or bending of the control shaft of a rotary controlled electric welding machine, or other injury in case too great a thickness of material is inserted between the welding contacts or points.

A further object of the invention is to provide a rotary timing switch construction for electric welding machines which is simple in structure and permits of a desirable range of adjustment.

A further object of the invention is to provide rotary means which are simple and efficient for operating the movable member of a pair of welding contacts or points.

A further object of the invention is to provide means for efficiently insulating the work supporting arm from the framework of the machine so as to utilize said arm to advantage as a part of the secondary circuit of the transformer which supplies welding current to the contacts.

Other objects of the invention will appear more fully hereinafter.

The invention consists substantially in the construction, combination, location and relative arrangement of parts, all as will be more fully hereinafter set forth, as shown in the accompanying drawings, and finally pointed out in the appended claims.

Referring to the accompanying drawings:—

Fig. 2 is a top plan view of the same, parts in horizontal section, through the worm drive gear.

Fig. 3 is a broken view in section on the line 3, 3, Fig. 2, looking in the direction of the arrows.

Fig. 4 is a broken detail view in section through the clutch operating mechanism on the line 4, 4, Fig. 3, looking in the direction of the arrows.

Fig. 5 is a broken detail view in section on the line 5, 5, Fig. 2, looking in the direction of the arrows.

Fig. 6 is a view in end elevation of the carrier for the movable member of the pair of welding contacts or points.

Fig. 7 is a detail view, parts broken out, showing the rotary contact mechanism for controlling the welding circuit, on the line 7, 7, Fig. 2, looking in the direction of the arrows.

Fig. 8 is a broken detail view in top plan of the rotary contact.

Fig. 9 is an end elevation of the same.

Fig. 10 is a broken detail view in section on the line 10, 10, Fig. 1, showing the manner of connecting and insulating the work arm.

The same part is designated by the same reference numeral wherever it occurs throughout the several views.

Figure 1:
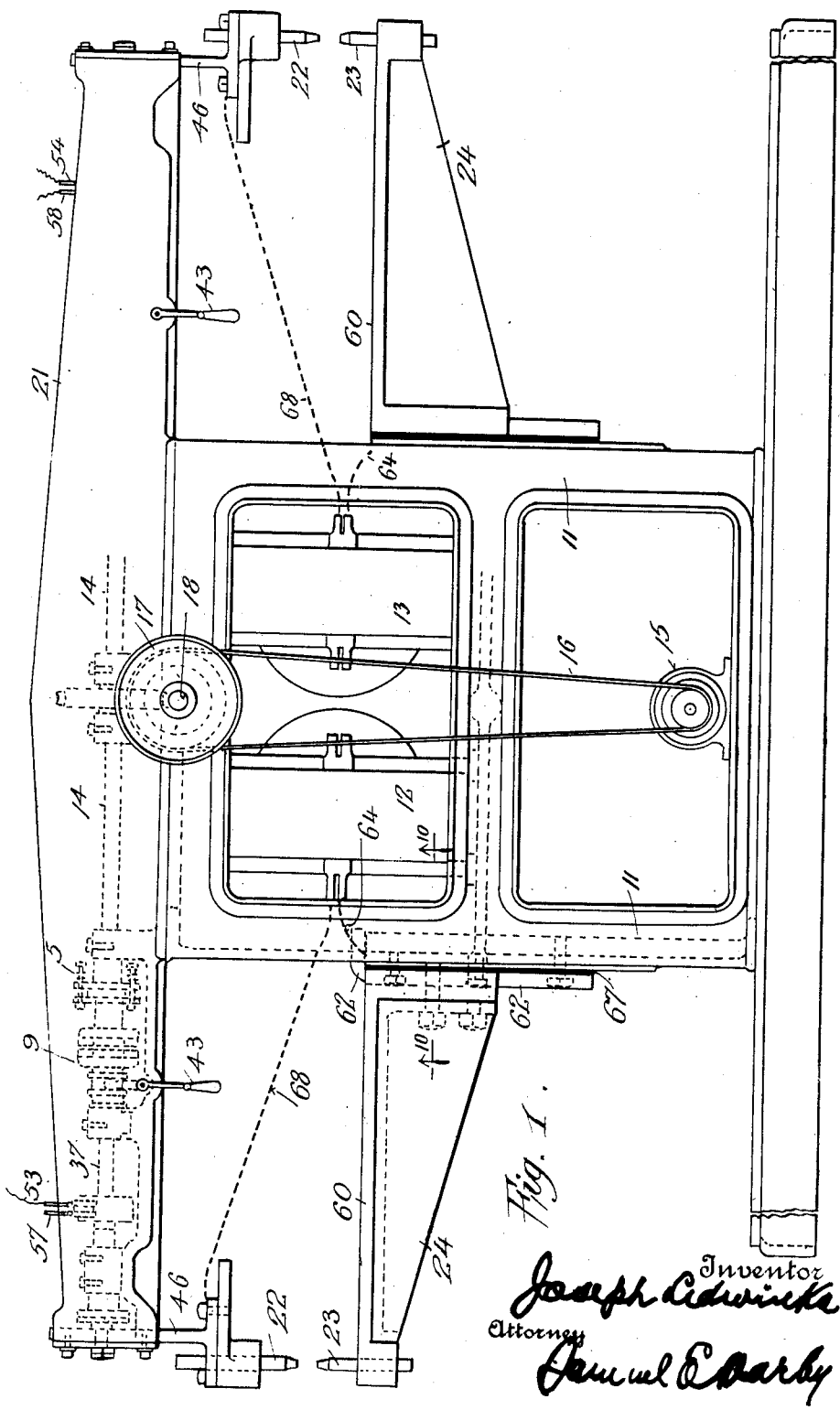
Figure 1 is a view in front elevation of a duplex rotary electric welding machine constructed in accordance with and embodying the principles of my invention.

In the drawings 11 designates a standard or framework upon which the various operating parts of the machine are mounted. Suitably mounted in the framework 11 are the transformers 12, 13, which may be of the usual or any well known construction and arrangement. In the upper part of the frame work 11 is journaled a shaft 14 which extends transversely across the supporting frame and beyond the side edges thereof and to which rotary motion may be imparted in any suitable or convenient manner. In practice I prefer to drive shaft 14 through gearing capable of control so as to vary the speed of rotation of said shaft. A simple arrangement for accomplishing this result is shown wherein a cone drive pulley 15 is mounted in the base of the framework 11 and receives power from any convenient scource and transmits rotation through a belt or other connection 16 to a coöperating and reversely arranged cone pulley 17 carried by a shaft 18 suitably journaled in the upper part of the framework and upon which shaft is carried a worm 19 meshing with and driving a gear 20 mounted on shaft 14. This arrangement of gearing is simple and secures a desirable speed control for the shaft 14. The shaft 14 is journaled in suitable bearings in a cross portion 21, which, as above indicated, extends beyond the sides of the main frame 11 to form overhangs. At each outer end of the overhanging frame member 21 is mounted a welding contact or point 22, each of which coöperates with a contact point 23 carried by a work holder or arm 24, said work arms or holders being bolted to but insulated from the main frame 11 for vertical adjustment thereon, suitable mechanism, presently to be described, being provided for securing reciprocations of the welding points 22 toward and from their coöperating points 23, said reciprocations being effected through the rotations of shaft 14.

In the operation of welding machines employing a power driven mechanism for reciprocating the movable member of the pairs of welding points it frequently happens that undue strains and twists are imposed which cause springing or bending of the drive shaft or injury to the machine in other respects or in the carrier heads which carry the electrodes or points, particularly where work of varying thicknesses is operated upon. In order to avoid injury resulting from this and other causes, and in accordance with the principles of my invention, I propose to provide a safety or slip clutch mechanism in the line of shaft drive which will permit a desirable degree of yielding in order to absorb any unnecessary strains that might be imposed. A simple structure of safety or slip clutch is shown, see particularly Figs. 2, 3 and 5, wherein the shaft 14 carries a sleeve 25 formed with a flange 26 at its end to form an abutment against which works a flange 27 on a sleeve 28 which is splined to a shaft section 29 by the key 30. A fiber disk or washer 31 is interposed between the abutting surfaces or flanges 26, 27. A ring 32 engages loosely behind flange 27 with a fiber or other ring washer 33 interposed therebetween. The ring 32 is carried by bolts 34 which extend through openings in the flange 26 and springs 35 are interposed between said flange 26 and the heads or nuts 36 carried by the ends of said bolts. This arrangement provides a safety or slip clutch mechanism for coupling the shaft sections 14, 29, resulting in absorbing any undue bending or twisting strains which may be imposed upon the mechanism saving the machine from breakage or injury.

I will now describe the clutch mechanism by which the rotations of shaft section 29 are communicated to the operating shaft section 37, and which affords means for uncoupling the operating shaft 37 from its driving shaft section. This clutch mechanism consists of clutch teeth respectively formed in the opposing faces of clutch heads 38, 39, see Figs. 2 and 3, the former being formed on sleeve 28, which, as above explained, is keyed to shaft section 29, while the latter is splined to rotate with shaft 37 but capable of being shifted longitudinally therealong. The shifting member of the clutch is shifted into and out of engaging relation with the member 38 by hand or otherwise in any simple or convenient manner, as for example, by means of a yoke 40, straddling and having its arms received in a groove 41 formed in the hub of member 39, said yoke being carried by a rock shaft 42 journaled in the frame 21 and carrying an operating handle 43. In order to secure the proper relation of the parts with respect to the circuit controlling contacts it is important that the clutch members effect their engagement while in a definite relation with respect to each other, otherwise the proper timing of the welding operations may be disturbed. To accomplish this I provide a groove 44 in the peripheral surface of the clutch head 39 in which is received an adjustable screw 45, see Fig. 3, and which holds said clutch member 39 and its associated driving shaft section 37 against rotation. When the clutch member 39 is shifted into driving relation with respect to the head 38 the screw 45 clears the slot 44 and permits the clutch member 39 to rotate. With this arrangement the clutch member 39 must be in a fixed relation with reference to the operation of the welding point 22 before the clutch can be thrown into or out of clutching relation. I am thus enabled to avoid disturbance of the timing operations of the machine.

I will now describe the construction for reciprocating the welding point 22. Each movable welding point is mounted in a carrier 46 which is mounted to slide vertically in the end of the overhanging frame portion 21. A stud or pin 47 is adjustably mounted eccentrically in a face plate 48 for adjustment transversely across the face of said plate, which plate is coupled to the operating shaft section 37. This eccentric pin extends through a bushing 49 which works in a transverse slot 50 formed in the point carrier 46. With this construction when rotations are imparted to the drive shaft section 37 the carrier 46 is reciprocated vertically and to an extent or degree determined by the eccentricity to which the stud or pin 47 may be adjusted. This adjustment of the carrier 46 is of course regulated by the thickness of the work to be welded.

I will now describe the timing contact mechanism for the current supply circuits, particular reference being had to Figs. 7, 8 and 9.

In this connection it is to be understood that in the operation of the machine the circuit which carries the welding current and supplies such current to the welding points or electrodes must be closed only when the electrodes are brought into proper relation to each other and to the work and with sufficient bearing pressure upon the work to accomplish the welding operation, and the current supply circuit should remain closed with the parts in this relation only so long as may be necessary to accomplish the work. At the same time it is desirable to provide means for properly adjusting the duration of current supply to accommodate different classes and character of welding points to be made. It is among the special purposes of my present invention to provide a timing contact mechanism which is simple and efficient and which accomplishes the desired objects and purposes. In carrying out my invention in this respect I mount upon the driving shaft section 37 a carrier member 51 of suitable insulating material, upon the periphery of which is permanently mounted a strip 52 of conducting material. Disposed on opposite sides of the conductor strip 52 are the adjustable conductor strips 53, 54. The position of the conductor strips 53, 54, relatively to the conductor strip 52 may be adjusted in any simple or convenient manner, such, for instance, as providing the strip 52 with a slot or opening 55 transversely therethrough in which work adjusting bolts 56 serve to clamp the strips 54, 53, to the sides of strip 52. By loosening up on the nuts of the bolts 56 the strips 53, 54, may be shifted bodily along strip 52. These strips 52, 53, 54, preferably form the conductor segments positioned upon the carrier disk or wheel 51 and with which coöperate the contacts 57, 58, the contact 57 coöperating to bridge the conductor strips 54, 52, while the contact 58 bridges the contact segments 53, 52, as the shaft 37 rotates carrying the contact segments past said contacts 57, 58. These contacts 57, 58, are in series in the current supply circuit of the primary of the transformer 12, 13. The contact segments 53, 54, are insulated from the segment 52, as indicated at 59. In the proper timing of the apparatus the circuits of the primaries of the transformers are closed through the contacts 57, 58, when the welding points 22, 23, are brought into contact with the work which is positioned between them at the proper degree of pressure and the adjustment of the segments 53, 54, relatively to segment 52 52 controls the duration of time the primary circuits remain closed.

I will now describe the mounting of the work supporting arms 24, particular reference being had to Figs. 1 and 10. Ordinarily the work supporting arms are of cast iron with the upper portion 60 thereof of copper which forms a part of the secondary coil of the transformer. The copper member 60 extends downwardly from the horizontal supporting surface of the arm at the inner end of the latter and is formed with a groove in the face thereof, the edges of which groove are undercut as indicated at 61 to receive and be adjusted vertically upon a copper member 62 which is bolted by bolts 63 to the side surface of the frame 11. The copper member 62 constitutes a terminal or support connection for the secondary coil of the transformer as indicated in dotted lines at 64, Fig. 1. The arm 24 and its copper member 60 are vertically adjustable upon the frame 11 and upon the fixed copper terminal 62 and is held in vertical adjustment by means of a stud or bolt 65 which passes through said arm 24, member 60, and member 62, and through the frame 11, as clearly shown in Fig. 10, but which is insulated therefrom by an insulating washer 66. Likewise the copper terminal member 62 is insulated from the frame 11 as indicated at 67. As above indicated the movable welding point or electrode 22 also forms a terminal of the secondary coil of the transformer as indicated by dotted lines at 68, Fig. 1. Thus it will be seen that the circuit of the secondary winding of the transformer includes in series the coöperating pair of welding points or electrodes 22, 23, copper member 60, terminal member 62, connection 64, transformer secondary coil and connection 68. This circuit is closed only when the electrodes 22, 23, are brought into proper bearing and contact upon work positioned between them.

In a duplex machine such as is shown in the drawings the frame 11 carries the two transformers 12, 13, one supplying current to a secondary circuit which includes the welding electrodes and their associated work arm, slip clutch, working clutch, timing contact and operating connections on one side of the machine, while the secondary of the other transformer includes the contact points or electrodes having their associated work supporting arm, safety slip clutch, working clutch, timing contact and operating connections at the other side of the machine.

It will be seen that the mechanism at either side of the machine may be thrown into or out of operation wholly independently of the mechanism on the opposite side of the machine.

From the foregoing description it will be seen that I provide an efficient rotary electric welding machine with proper timing arrangement, operating clutch and safety slip clutch and operating connections which are under control at all times, and at the same time provide means for adjusting the work arms without deranging the relation of the same in the secondary circuit of the transformer associated therewith.

Having now set forth the objects and nature of my invention, and a construction embodying the principles thereof, what I claim as new and useful, and of my own invention, and desire to secure by Letters Patent is:—

1. In an electric welding machine, a frame, a transformer mounted therein, welding electrodes arranged in the secondary circuit of said transformer, a power driven shaft journaled in said frame, and connections operated thereby and including friction disks yieldingly held in contact with each other for reciprocating one of said electrodes toward and from the other.

2. In an electric welding machine, a transformer, welding electrodes arranged in the secondary circuit of said transformer, a power driven shaft suitably journaled, connections operated thereby for reciprocating one of said electrodes toward and from the other, and an automatically operating safety slip clutch device for coupling the power shaft to said electrode operating connections.

3. In an electric welding machine, a transformer, welding electrodes arranged in the secondary circuit of said transformer, a power driven shaft, a shaft section, friction plates yieldingly held in surface contact with each other to form a safety slip clutch connecting said driving shaft and shaft section, and means operated by said shaft section for reciprocating one of said electrodes.

4. In an electric welding machine, a transformer, welding electrodes arranged in the secondary circuit of said transformer, a power driven shaft, a shaft section, flanged sleeves respectively mounted on said shaft and shaft section, a ring member loosely mounted on one of said sleeves and yieldingly pressed toward and into frictional engagement with the flange of the other of said sleeves, and means operated by said shaft section for reciprocating one of said electrodes.

5. In an electric welding machine, a frame, a transformer mounted therein, welding electrodes arranged in the secondary circuit of said transformer, a power driven shaft journaled in said frame, a shaft section also journaled in said frame, flanged sleeves respectively mounted on said shaft and shaft section, a friction disk interposed between the abutting faces of the flanges of said sleeves, a ring member loosely mounted on one of said sleeves and yieldingly pressed toward the flange of the other of said sleeves, and means operated by said shaft section for reciprocating one of said electrodes.

6. In an electric welding machine, a transformer, welding electrodes arranged in the secondary circuit of said transformer, a power driven shaft, frictionally engaging connections operated thereby for reciprocating one of said electrodes toward and from the other, and manually operated means to clutch and unclutch said operating connections to and from said shaft.

7. In an electric welding machine, a frame, a transformer mounted therein, welding electrodes arranged in the secondary circuit of said transformer, a power driven shaft journaled in said frame, connections operated thereby for reciprocating one of said electrodes toward and from the other, and contact devices controlled by said shaft for controlling the transformer circuit.

8. In an electric welding machine, a transformer, welding electrodes arranged in the secondary circuit of said transformer, a power driven shaft, connections operated thereby for reciprocating one of said electrodes toward and from the other, contact segments carried by said shaft, and coöperating stationary contacts arranged in a circuit of the transformer.

9. In an electric welding machine, a frame, a transformer mounted therein, welding electrodes arranged in the secondary circuit of said transformer, a power driven shaft journaled in said frame, connections operated thereby for reciprocating one of said electrodes toward and from the other, and adjustable timing contact devices controlled by said shaft for controlling a circuit of the transformer.

10. In an electric welding machine, a frame, a transformer mounted therein, welding electrodes arranged in the secondary circuit of said transformer, a power driven shaft journaled in said frame, connections operated thereby for reciprocating one of said electrodes toward and from the other, contact segments secured to said shaft and adjustable relatively to each other, and coöperating stationary contacts arranged in a circuit of the transformer.

11. In an electric welding machine, a frame, a transformer mounted therein, welding electrodes arranged in the secondary circuit of said transformer, a power driven shaft journaled in said frame, connections operated thereby for reciprocating one of said electrodes toward and from the other, a contact segment secured to said shaft, contact segments respectively disposed on opposite sides of said first mentioned segment and adjustable relatively thereto, and stationary contacts arranged in a circuit of the transformer and coöperating with said contact segments.

12. In an electric welding machine, a transformer, a work arm carried by said frame, a power driven shaft, a welding electrode carried by said work arm, a coöperating welding electrode, a carrier therefor, said carrier mounted to slide in said frame, and connections driven by said shaft for reciprocating said carrier, said connections including an adjustably mounted eccentric pin arranged to engage said carrier.

13. In an electric welding machine, a frame, a transformer mounted therein, a work arm carried by said frame, a power driven shaft journaled in said frame, a welding electrode carried by said work arm, a coöperating welding electrode, a carrier therefor, said carrier mounted to slide in said frame and having an opening therein, and a pin or stud eccentrically mounted on said shaft and engaging in the opening in said carrier to reciprocate the same.

14. In an electric welding machine, a frame, a transformer mounted therein, a work arm carried by said frame, a power driven shaft journaled in said frame, a welding electrode carried by said work arm, a coöperating welding electrode, a carrier therefor, said carrier mounted to slide in said frame, said carrier having a slot therein and an adjustably mounted eccentric pin carried by said shaft and engaging in the slot in said carrier to reciprocate the latter.

15. In an electric welding machine, a frame, a transformer mounted therein, coöperating welding electrodes, a work arm having a conducting member connected to one of said electrodes, a conductor plate secured to but insulated from said frame, said arm and its conducting member being mounted to slide upon for adjustment relative to said conductor plate without disturbing electrical connection of said conductor plate and conductor member, said electrodes, conductor member and conductor plate being included in series in the secondary circuit of said transformer.

16. In an electric welding machine, transformers, coöperating pairs of welding electrodes disposed at opposite sides of said frame, each pair of electrodes being associated in the secondary circuit of a transformer, a power driven shaft, and connections operated by said shaft for reciprocating one member of each pair of welding electrodes.

17. In an electric welding machine, a frame, transformers, welding electrodes disposed at opposite sides and arranged in coöperating pairs, each coöperating pair of electrodes arranged in the secondary circuit of a transformer, a power driven shaft journaled in said frame, connections operated thereby for reciprocating one member of each pair of electrodes, and means for independently connecting and disconnecting said operating connections.

18. In an electric welding machine, a frame, transformers, welding electrodes disposed at opposite sides and arranged in coöperating pairs, each coöperating pair of electrodes arranged in the secondary circuit of a transformer, a power driven shaft journaled in said frame, connections operated thereby for reciprocating one member of each pair of electrodes, and a safety slip clutch associated with the reciprocating connections of each reciprocating electrode.

19. In an electric welding machine, transformers, welding electrodes disposed at opposite sides and arranged in coöperating pairs, each coöperating pair of electrodes arranged in the secondary circuit of a transformer, a power driven shaft, connections operated thereby for reciprocating one member of each pair of electrodes, and timing contact devices operated by said shaft for controlling the circuits of each transformer.

20. In an electric welding machine, a frame, transformers mounted therein, welding electrodes disposed at opposite sides and arranged in coöperating pairs, each coöperating pair of electrodes arranged in the secondary circuit of a transformer, a power driven shaft journaled in said frame, connections operated thereby for reciprocating one member of each pair of electrodes, and a clutch for independently connecting and disconnecting said reciprocating connections.

In testimony whereof I have hereunto set my hand on this 14th day of April, A. D. 1919.

JOSEPH LEDWINKA.